(12) United States Patent
Zoboli et al.

(10) Patent No.: US 8,496,762 B2
(45) Date of Patent: Jul. 30, 2013

(54) ALUMINUM TREATMENT COMPOSITIONS

(76) Inventors: Roberto Zoboli, Novara (IT); Sara Salsa, Bellinzago (IT); Massimo Garzone, Cavaglia (IT)

( * ) Notice: Subject to any disclaimer, the term of this patent is extended or adjusted under 35 U.S.C. 154(b) by 288 days.

(21) Appl. No.: 13/021,026

(22) Filed: Feb. 4, 2011

(65) Prior Publication Data

US 2012/0199250 A1    Aug. 9, 2012

(51) Int. Cl.
  *C23C 22/56*    (2006.01)
  *C23C 22/00*    (2006.01)

(52) U.S. Cl.
  USPC ........ 148/275; 148/243; 148/247; 106/14.05; 106/14.11

(58) Field of Classification Search
  USPC ............. 148/275, 247, 243; 106/14.05, 14.11
  See application file for complete search history.

(56) References Cited

U.S. PATENT DOCUMENTS

| | | | |
|---|---|---|---|
| 3,912,548 A | 10/1975 | Faigen | |
| 3,966,502 A | 6/1976 | Binns | |
| 4,191,596 A | 3/1980 | Dollman et al. | |
| 4,790,856 A | 12/1988 | Wixon | |
| 5,328,525 A * | 7/1994 | Musingo et al. | 148/247 |
| 5,419,790 A | 5/1995 | Miller | |
| RE36,742 E | 6/2000 | Correll et al. | |
| 6,123,782 A | 9/2000 | Rosengard | |
| 6,312,812 B1 | 11/2001 | Hauser et al. | |
| 6,412,642 B2 | 7/2002 | Charles et al. | |
| 6,488,990 B1 | 12/2002 | Wetterer et al. | |
| 6,602,582 B2 | 8/2003 | Winterowd | |
| 6,761,933 B2 | 7/2004 | Warburton et al. | |
| 7,332,021 B2 | 2/2008 | Fristad et al. | |
| 7,422,649 B2 * | 9/2008 | Nguyen et al. | 156/272.2 |
| 7,662,241 B2 | 2/2010 | Sinko | |
| 7,695,771 B2 | 4/2010 | Ostrovsky | |
| 7,709,434 B2 | 5/2010 | Smith et al. | |
| 7,736,764 B2 | 6/2010 | Liu et al. | |
| 7,749,368 B2 | 7/2010 | McMurdie et al. | |
| 2003/0199629 A1 * | 10/2003 | Gelman et al. | 524/514 |
| 2008/0244845 A1 | 10/2008 | Goibier et al. | |
| 2009/0032144 A1 * | 2/2009 | McMillen et al. | 148/247 |
| 2009/0101512 A1 | 4/2009 | Kubota | |

FOREIGN PATENT DOCUMENTS

WO    WO 02/076648    10/2002

* cited by examiner

*Primary Examiner* — Lois Zheng
(74) *Attorney, Agent, or Firm* — Carmody & Torrance LLP

(57) ABSTRACT

A method of preparing an aluminum or aluminum alloy substrate to accept an adherent coating thereon is provided. The method includes the steps of degreasing the substrate, deoxidizing the substrate, and providing a prepaint conversion coating on the degreased and deoxidized substrate. The prepaint conversion coating composition comprises i) a source of fluoride ions; ii) a source of zirconium ions; iii) an acrylic resin; and iv) an optical brightener and forms a colorless, chromium-free conversion coating on the aluminum substrate that can be observed by exposing the treated substrate to UV light.

14 Claims, No Drawings

ALUMINUM TREATMENT COMPOSITIONS

FIELD OF THE INVENTION

The present invention relates generally to the treatment of aluminum and aluminum alloy surfaces with prepaint conversion coating compositions that are detectable using a UV lamp.

BACKGROUND OF THE INVENTION

Conversion coatings are widely used with metals, including aluminum and aluminum alloys and magnesium and magnesium alloys, among others, in which a treatment solution is applied to the metal surface and the metal surface reacts with the treatment solution to convert to a corrosion protective film. In many instances, the protective film serves as a primer which may be top-coated with a paint for aesthetical purposes and to provide enhanced corrosion resistance.

Historically, conversion coatings have employed chromates where maximum corrosion protection is desired or required. One of the most widely used chromate treatments for aluminum and aluminum alloy substrates is a chromate-containing process which produces a protective coating on aluminum that ranges in color from light iridescent gold to tan. This process can be operated at room temperature and the coating produced minimizes corrosion and provides an improved bond for subsequently applied paint. This process is based on soluble chromates containing $CrO_4^-$ as an inhibitor species and provides a robust conversion coating on various aluminum and aluminum alloy surfaces. For example, chromate conversion coating on Al 2024 T-3 aluminum alloy panels has been demonstrated to resist salt spray exposure in excess of 300 hours without pitting.

However, chromate processes produce chromate waste and residue which must be disposed of and which are either not permitted or are severely restricted by the U.S. Environmental Protection Agency (EPA) and other similar environment, health and safety regulators. Due to heightened concerns over the negative health and ecological effects of hexavalent chromium and chromium salts, there continues to be an ongoing effort to develop acceptable alternatives to chromate conversion coatings.

While various efforts have been made to avoid the use of chromates in conversion coatings, special treatments are often required which are either unacceptable to the user or that do not provide the required level of corrosion protection. In addition, while products have been developed that have the same or similar performance to hexavalent chromium conversion coatings, these products typically do not provide any color to aid in distinguishing a treated surface from an untreated surface or produce inconsistent color or discoloration that make the appearance of the treated surface undesirable to the user.

U.S. Pat. No. 6,412,642 to Charles et al., the subject matter of which is herein incorporated by reference in its entirety, describes a method of applying a marking agent to metal stock, such as aluminum sheet, for scrap sorting purposes in order to provide a detectable mark on pieces of manufacturing scrap so that scrap can be sorted and the marked alloy scrap pieces separated from scrap of other alloy sheet to which the marking agent is not applied. In this instance, the marking agent is added to a lubricant or prelubricant that is typically applied to the sheet by the sheet producer prior to the manufacturing customer. Examples of the marking agents include visible dyes, pigments, fluorescent dyes, and compounds having distinctive infrared absorption spectra However, Charles does not recognize the use of marking agent in prepaint conversion coating compositions or the particular problems that may arise if one attempts to incorporate marking agents into the prepaint conversion coating composition.

In particular, the addition of organic dyes to conversion coating compositions typically leads to higher coating costs, and more importantly, complicates the chemistry of the conversion coating solution which leads to difficulties in controlling the process solution. Thus, it would be desirable to develop a conversion coating composition for aluminum and aluminum alloy substrates that incorporates a suitable marking agent and that provides good corrosion protection while at the same time maintaining good bath stability.

U.S. Pat. No. 6,602,582 to Winterowd, the subject matter of which is herein incorporated by reference in its entirety, describes a composition for treating the edge of a wood-based panel. The composition is a colorless edge sealant that includes an optical brightener which acts as a latent visual marker that can be observed by exposure to UV light. However, this composition is limited to use of treating edges of wood-based panels and again there is no suggestion that such a visual marker would be usable in conversion coating compositions.

SUMMARY OF THE INVENTION

It is an object of the present invention to provide an improved chromium-free prepaint conversion product for use on aluminum and aluminum alloy substrates.

It is another object of the present invention to provide an improved chromium-free prepaint conversion product that, when applied, can be distinguished from an untreated surface.

It is another object of the present invention to provide an improved chromium-free prepaint conversion product that contains a suitable visual marker.

It is still another object of the present invention to provide an improved chromium-free prepaint conversion product that can be detected using a UV source.

It is still another object of the present invention to provide a chromium-free prepaint conversion product that provides the same level of corrosion protection as chromium prepaint products.

To that end, in a preferred embodiment, the present invention relates generally to an aqueous composition for providing a chromium-free conversion coating on an aluminum substrate, the aqueous composition comprising:
 a) a pH adjuster;
 b) a source of zirconium ions;
 c) an acrylic resin; and
 d) an optical brightener.

In another preferred embodiment, the present invention relates generally to a method of preparing an aluminum substrate to accept an adherent coating thereon, the method comprising the steps of:
 a) degreasing the substrate;
 b) deoxidizing the substrate; and
 c) providing a conversion coating on the degreased and deoxidized substrate, the conversion coating comprising:
  i) a pH adjuster;
  ii) a source of zirconium ions;
  iii) an acrylic resin; and
  iv) an optical brightener,
whereby a, chrome-free conversion coating is formed on the aluminum substrate that can be observed by exposing the treated surface to UV light. The coating is preferably colorless in visible light.

DETAILED DESCRIPTION OF THE PREFERRED EMBODIMENTS

The present invention provides a chrome-free product that is usable in the aluminum prepaint industry to prepare the aluminum surface to accept an organic coating thereon. The aluminum substrate may be, for example, an aluminum or aluminum alloy such as aluminum 6060 or 6061 or similar alloy. Other aluminum alloys are also well known to those skilled in the art and can be treated using the precoating conversion coating composition described herein.

The aluminum substrate may also include aluminum plated steel or aluminum alloy plated steel substrates. Furthermore, the bare metal substrate being coated may also be a cut edge of a substrate that is otherwise treated and/or coated over the rest of its surface. The metal substrate may be in the form of a metal sheet or a fabricated part, and may include parts for aircraft, aerospace, missiles, vehicles, trains, electronic devices, apparatuses, construction equipment, military equipment, sport equipment, among others, by way of example and not limitation.

The substrate to be coated utilizing the method and conversion coating composition described herein is preferably cleaned to remove grease, dirt and other matter from the surface using a mild or strong alkaline cleaner as is generally known in the art. This alkaline cleaning step is preferably followed by and/or preceded by a water rinse.

Thereafter, the metal substrate is preferably rinsed with an aqueous acidic solution, before contacting the substrate with the conversion coating composition, to deoxidize the substrate. Examples of suitable rinse solutions include mild and strong acidic cleaners, such as dilute nitric acid solutions, by way of example and not limitation.

In a preferred embodiment, the present invention relates generally to an aqueous composition for providing a chromium-free conversion coating on an aluminum or aluminum alloy substrate, the aqueous composition comprising:
 a) a pH adjuster;
 b) a source of zirconium ions;
 c) an acrylic resin; and
 d) an optical brightener.

The pH of the aqueous conversion coating composition is preferably in the range of about 1 to 6, preferably 2 to 4. The pH of the aqueous composition may be adjusted using mineral acids such as hydrofluoric acid, fluoroboric acid, phosphoric acid, and the like, including mixtures thereof; organic acids such as lactic acid, acetic acid, citric acid, sulfamic acid, or mixtures thereat and water soluble or water dispersible bases such as sodium hydroxide, ammonium hydroxide, ammonia, or amines such as triethylamine, methylethyl amine, or mixtures thereof.

In a preferred embodiment the pH adjuster is hydrofluoric acid. For example, a 40% solution of hydrofluoric acid may be used. The concentration of hydrofluoric acid in the aqueous conversion coating composition may preferably be within the range of about 315 ppm to about 700 ppm, or another amount necessary to adjust the pH to within the desired range.

The source of zirconium typically comprises a water soluble zirconium compound. A wide variety of soluble zirconium compounds are usable in solutions of the present invention. The selection of the compound to be used depends on its commercial availability as well as its stability in solution at the operating pH of the rinse process. It is important that the zirconium compound does not hydrolyze to insoluble hydrous zirconium dioxide or an insoluble zirconyl salt when in solution at the operation pH of the process, because such hydroxyls would cause the precipitation of zirconium from solution. When precipitation occurs, the concentration of the necessary zirconium in solution is diminished which reduces the amount of zirconium available to treat the conversion coating, resulting in a deterioration of the effectiveness of the solution.

Suitable zirconium compounds that are usable in compositions of the present invention are aqueous solutions comprised of soluble zirconium compounds selected from the group consisting of alkali metal and ammonium fluorozirconates, zirconium carboxylates, and alkali metal and ammonium salts of zirconium hydroxy carboxylates. Examples of zirconium carboxylates include zirconium acetate and zirconium oxalate. In a preferred embodiment, the source of zirconium ions is zirconium acetate. The concentration of zirconium ions in the aqueous prepaint conversion coating composition may preferably be within the range of about 170 and about 400 ppm.

The conversion coating composition may optionally, but preferably, also comprise a fluoroacid which is an acid fluoride or acid oxyfluoride with an element selected from the group consisting of Ti, Zi, Hf, Si, Sn, Al, Ge and B. The fluoroacid can simultaneously act as the pH adjuster. The fluoroacid should be water-soluble or water-dispersible and preferably comprise at least 1 fluorine atom and at least one atom of an element selected from the group consisting of Ti, Zr, Hf, Si, Sn, Al, Ge or B. The fluoroacids are sometimes referred to as "fluorometallates".

The fluoroacids can be defined by the following general empirical formula (I):

$$H_p T_q F_r O_s$$

wherein: each of q and r represents an integer from 1 to 10; each of p and s represents an integer from 0 to 10; T represents an element selected from the group consisting of Ti, Zr, Hf, Si, Sn, Al, Ge, and B. Preferred fluoroacids of empirical formula (I) include: T is selected from Ti, Sr, or Si; p is 1 or 2; q is 1; r is 2, 3, 4, 5, or 6; and s is 0, 1 or 2.

One or more of the H atoms may be replaced by suitable cations such as ammonium, metal, alkaline earth metal or alkali metal cations (e.g. the fluoroacid can be in the form of a salt, provided such salt is water-soluble or water-dispersible). Examples of suitable fluoroacid salts include $(NH_4)_2SiF6m$, $MgSif_6$, $Na_2Sif_6$ and $Li_2SiF_6$.

The preferred fluoroacids used in the coating compositions of the invention are selected from the group consisting of fluorotitanic acid ($H_2TiF_6$), fluorozirconic acid ($H_2ZrF_6$), fluorosilicic acid ($H_2SiF_6$), fluoroboric acid ($HBF_4$), fluorostannic acid ($H_2SnF_6$) fluorogermanic acid ($H_2GeF_6$), fluorohafnic acid ($H_2HfF_6$), fluoroaluminic acid ($H_3AlF_6$), and salts of each thereof. The more preferred fluoroacids are fluorotitanic acid, fluorozirconic acid, fluorosilicic acid, and salts of each thereof. Some of the salts that can be used include alkali metal and ammonium salts, e.g., $Na_2MF_6$ and $(NH_4)_2\,MF_6$, where M is Ti, Zr, and Si.

The concentration of the one or more fluoroacids in the coating compositions of the invention can be relatively quite low. For example, a fluoroacid concentration of about 5 ppm can be used, and still provide corrosion resistant coatings (ppm=parts per million). The concentration of the one or more fluoroacids in the coating compositions can be from about 5 ppm (about 0.0005% by weight) to about 10,000 ppm (about 1.0% by weight), from about 5 ppm to about 1000 ppm and from 5 ppm to about 400 ppm. The preferred concentrations of the one or more fluoroacids in the coating compositions is from about 3 ppm to about 3000 ppm, more preferably from about 10 ppm to about 400 ppm.

The aqueous conversion coating composition also comprises a resinous or polymeric material, which may include both water soluble as well as water dispersible polymers. In a preferred embodiment, the aqueous composition comprises a water soluble polyacrylic acid. Water dispersible emulsions or latexes of polyacrylic acid derivatives are also available, such as the alkali metal and ammonium salts of polyacrylic acid, and polyacrylic acid esters. By the term "acrylic acid polymer" or "polyacrylic acid," it should be understood that this means and applies to all types of polymers to be utilized in the aqueous composition, whether they be water dispersible or water soluble salts, esters, or the acid. In one preferred embodiment, the polymer is a homopolymer of acrylic acid, and is preferably a polyacrylic acid having a molecular weight of about 5,000 to about 500,000.

Aqueous solutions of polyacrylic acid are available commercially, for example, those sold under the name Acrysol® A-1, Acrysol® A-3, and Acrysol® A-5. Water dispersible emulsions of polyacrylic acid esters are also available, for example those solid under the name Rhoplex® Ac-35. Another polyacrylic acid that is usable in the present invention is a polyacrylic acid homopolymer, available from Rohm and Haas under the tradename Acumer™ 1510.

In a preferred embodiment, the acrylic resin is a polyacrylic acid having a molecular weight of between about 5,000 and about 500,000, preferably between about 50,000 to about 75,000. The concentration of the acrylic resin in the aqueous prepaint conversion coating composition may preferably be within the range of between about 700 and about 2000 ppm.

The composition of the present invention also utilizes a suitable visual marker, which is most preferably an optical brightener that can be detected using a UV light source but that appears colorless or substantially colorless in the visible light spectrum. Optical brighteners are fluorescent white dyes that absorb UV light and fluoresce in the blue region of the visible spectrum. Optical brighteners absorb light in the ultraviolet range 275 to 400 nm and emit light in the ultraviolet blue spectrum 400-500 nm. When added to a coating composition, no obvious color change occurs, but the fluorescence is detectable in the presence of UV light. Thus, shining a UV light over the applied coating allows an individual to verify that the substrate has been treated and that coverage is complete, without imparting any color to the conversion coating composition or the conversion coating which is noticeable under the visible light spectrum.

Optical brighteners usable in the practice of the present invention are most preferably water soluble optical brighteners that are compatible with the remaining ingredients in the aqueous prepaint composition. Various water soluble optical brighteners are usable in the composition of the present invention, including for example, 4,4'-bis-(2-sulfostyryl)-biphenyl disodium salt (available under the tradename Tinopal® CBS-X from Ciba Specialty Chemicals Corporation), bistriazinyl derivatives of 4,4'-diaminostilbene-2,2'-disulfonic acid, sulfonated 2-(stilben-4-yl)naphthotriazoles, bis (azol-2-yl)stilbenes, bisstyrylbiphenyl sodium salt and sulfonated pyrazolines, by way of example and not limitation. Mixtures of optical brighteners can also be used.

In a preferred embodiment, the optical brightener comprises 4,4'-bis-(2-sulfostyryl)-biphenyl disodium salt. The concentration of the optical brightener in the aqueous prepaint conversion coating composition may preferably be within the range of between about 35 and about 100 ppm.

In another preferred embodiment, the present invention relates generally to a method of preparing an aluminum or aluminum alloy substrate to accept an adherent coating thereon, the method comprising the steps of:
  a) degreasing the substrate;
  b) deoxidizing the substrate; and
  c) providing a conversion coating on the degreased and deoxidized substrate, the conversion coating comprising:
    i) a pH adjuster;
    ii) a source of zirconium ions;
    iii) an acrylic resin; and
    v) an optical brightener,
whereby a, chrome-free conversion coating is formed on the aluminum substrate that can be observed by exposing the treated surface to UV light.

After the conversion coating composition has been applied to the aluminum substrate, the substrate may be dried by heating the substrate to a temperature of between about 120 and about 140° C.

The aluminum and aluminum alloy substrates may be contacted with the conversion coating composition by dipping, immersing, roll coating, squeegeeing, or spraying. In a preferred embodiment, the conversion coating composition is contacted with the aluminum substrate by spraying.

The substrate that has been contacted with the conversion coating composition, as described above, may then be coated with a composition comprising a film-forming resin. Any resin that forms a film can be used according to the present methods, absent compatibility problems. For example, resins suitable for electrocoat, powder or liquid coating compositions can be used. A particularly suitable resin is one formed from the reaction of a polymer having at least one type of reactive functional group and a curing agent having functional groups reactive with the functional group of the polymer. The polymers can be, for example, acrylic, polyester, polyether or polyurethane, and can contain functional groups such as hydroxyl, carboxylic acid, carbamate, isocyanate, epoxy, amide and carboxylate functional groups.

The powder coating compositions of the present invention may optionally contain additional additives such as waxes for flow and wetting, flow control agents, such as poly(2-ethylhexyl)acrylate, degassing additives such as benzoin and MicroWax C, adjuvant resin to modify and optimize coating properties, antioxidants, ultraviolet (UV) light absorbers and catalysts.

The liquid coating compositions of the present invention can similarly contain optimal additives such as plasticizers, antioxidants, light stabilizers, UV absorbers, thixotropic agents, anti-gassing agents, organic cosolvents, biocides, surfactants, flow control additives and catalysts. Any such additives known in the art can be used, absent compatibility problems.

The powder coating compositions are most often applied by spraying, and in the case of a metal substrate, by electrostatic spraying, or by the use of a fluidized bed. The powder coating can be applied in a single sweep or in several passes to provide a film having a thickness after cure of from about 1 to 10 mils (25 to 250 micrometers), usually about 2 to 4 mils (50 to 100 micrometers).

The liquid compositions of the invention can also be applied by any conventional method such as brushing, draw down, dipping, flow coating, roll coating, conventional and electrostatic spraying. Spray techniques are most often used. Typically, film thickness for liquid coatings can range between 0.1 and 5 mils, such as between 0.1 and 1 mil, or about 0.4 mils.

Generally, after application of the coating composition, the coated substrate is baked at a temperature sufficient to cure the coating. Metallic substrates with powder coatings are typically cured at a temperature ranging from about 120° C. to about 260° C. for 1 to 60 minutes, or from about 150° C. to about 205° C. for 15 to 30 minutes.

Certain liquid formulations can be cured at ambient temperature, such as those using a polyisocyanate or polyanhydride curing agent, or they can be cured at elevated temperatures to hasten the cure.

Alternatively, the treated substrate can be coated by electrocoating. The electrocoating step is done with a substantially lead-free, curable, electrodepositable composition and is followed by a curing step.

What is claimed is:

1. A method of preparing an aluminum or aluminum alloy substrate to accept an adherent coating thereon, the method comprising the steps of:
   a) degreasing the substrate;
   b) deoxidizing the substrate; and
   c) providing a conversion coating on the degreased and deoxidized substrate, the conversion coating comprising:
      i) a source of fluoride ions;
      ii) a source of zirconium ions;
      iii) an acrylic resin; and
      iv) about 35 to about 100 ppm of an optical brightener selected from the group consisting of 4,4'-bis-(2-sulfostyryl)-biphenyl disodium salt, a bistriazinyl derivative of 4,4'-diaminostilbene-2,2'-disulfonic acid, sulfonated 2-(stilben-4-yl)naphthotriazoles, bis (azol-2-yl)stilbenes, bisstyrylbiphenyl sodium salt, a sufonated pyrazoline, and combinations of one or more of the foregoing,
   wherein a chromium-free conversion coating is formed on the aluminum substrate that can be observed by exposing the treated substrate to UV light.

2. The method according to claim 1, wherein the substrate is dried after the conversion coating is applied.

3. The method according to claim 2, wherein the substrate is dried by heating the substrate to a temperature of between about 120 and 140° C.

4. The method according to claim 1, wherein the pH adjuster is selected from the group consisting of mineral acids, organic acids, water soluble or water dispersible bases, amines, fluoroacids, and combinations of one or more of the foregoing.

5. The method according to claim 4, wherein the pH adjuster is hydrofluoric acid.

6. The method according to claim 4, wherein the source of fluoride ions is present in the aqueous composition at a concentration of between about 315 ppm to about 700 ppm.

7. The method according to claim 4, wherein the source of zirconium ions is selected from the group consisting of alkali metal and ammonium fluorozirconates, zirconium carboxylates, and alkali metal and ammonium salts of zirconium hydroxy carboxylates.

8. The method according to claim 7, wherein the source of zirconium ions is zirconium acetate.

9. The method according to claim 7, wherein the source of zirconium ions is present in the aqueous composition at a concentration of between about 170 and about 400 ppm.

10. The method according to claim 1, wherein the acrylic resin comprises a water soluble polyacrylic acid.

11. The method according to claim 10, wherein the water soluble polyacrylic acid has a molecular weight of between about 50,000 to about 75,000.

12. The method according to claim 10, wherein the acrylic resin is present in the aqueous composition at a concentration of between about 700 and about 2000 ppm.

13. The method according to claim 1, wherein the optical brightener is 4,4'-bis-(2-sulfostyryl)-biphenyl disodium salt.

14. The method according to claim 1, comprising the step of coating the conversion coated substrate with a film forming resin.

* * * * *

UNITED STATES PATENT AND TRADEMARK OFFICE
CERTIFICATE OF CORRECTION

PATENT NO.         : 8,496,762 B2
APPLICATION NO.    : 13/021026
DATED              : July 30, 2013
INVENTOR(S)        : Roberto Zoboli et al.

It is certified that error appears in the above-identified patent and that said Letters Patent is hereby corrected as shown below:

In the Claims

Column 7, Line 19, Claim 1
After "c) providing a" insert -- chromium free --

Column 7, Line 20, Claim 1
Delete "the conversion coating" and replace it with -- using an aqueous conversion coating composition --

Column 7, Line 33, Claim 1
Delete "wherein a chromium-free" and replace it with -- wherein the chromium-free --

Column 8, Line 4, Claim 4
Delete "wherein the pH adjuster is" and replace it with -- wherein the aqueous conversion composition further comprises a pH adjuster --

Column 8, Line 14, Claim 7
Delete "claim 4," and replace it with -- claim 1, --

Column 8, Line 34, Claim 14
Delete "comprising the step" and replace it with -- comprising a step --

Signed and Sealed this
Twelfth Day of November, 2013

Teresa Stanek Rea
*Deputy Director of the United States Patent and Trademark Office*